United States Patent
He et al.

(10) Patent No.: US 10,461,850 B2
(45) Date of Patent: Oct. 29, 2019

(54) FREQUENCY SYNTHESIS-BASED OPTICAL FREQUENCY DOMAIN REFLECTOMETRY METHOD AND SYSTEM

(71) Applicants: SHANGHAI JIAOTONG UNIVERSITY, Shanghai (CN); NEUBREX CO., LTD., Hyogo (JP)

(72) Inventors: Zuyuan He, Shanghai (CN); Qingwen Liu, Shanghai (CN); Xinyu Fan, Shanghai (CN); Dian Chen, Shanghai (CN)

(73) Assignees: SHANGHAI JIAOTONG UNIVERSITY, Shanghai (CN); NEUBREX CO., LTD., Hyogo (JP)

( * ) Notice: Subject to any disclaimer, the term of this patent is extended or adjusted under 35 U.S.C. 154(b) by 0 days.

(21) Appl. No.: 16/066,119

(22) PCT Filed: Jan. 5, 2016

(86) PCT No.: PCT/CN2016/070108
§ 371 (c)(1),
(2) Date: Jun. 26, 2018

(87) PCT Pub. No.: WO2017/117707
PCT Pub. Date: Jul. 13, 2017

(65) Prior Publication Data
US 2019/0013862 A1 Jan. 10, 2019

(51) Int. Cl.
*H04B 10/071* (2013.01)
(52) U.S. Cl.
CPC ................ *H04B 10/071* (2013.01)
(58) Field of Classification Search
CPC ..................................... H04B 10/071
See application file for complete search history.

(56) References Cited

U.S. PATENT DOCUMENTS

2006/0187537 A1* 8/2006 Huber ............... H01S 3/106
359/337.22
2007/0127932 A1* 6/2007 Qi ..................... H04B 10/548
398/188

(Continued)

FOREIGN PATENT DOCUMENTS

CN 103763022 4/2014
CN 103984184 8/2014

(Continued)

OTHER PUBLICATIONS

Fan et al., "Phase-noise-compensated optical frequency domain reflectometry with measurement range beyond laser coherence length realized using concatenative reference method", Optics Letters, 32(22):3227-3229 (2007).

(Continued)

*Primary Examiner* — Omar S Ismail
(74) *Attorney, Agent, or Firm* — Wenderoth, Lind & Ponack, L.L.P.

(57) ABSTRACT

Frequency synthesis-based optical frequency domain reflectometry method and system are disclosed. The method is to implement optical frequency reflectometry and comprises: performing an electro-optic modulation and an acousto-optic modulation on a local light to obtain an optical pulse; inputting the optical pulse as a detection pulse optical signal to a test optical fiber; and detecting an obtained Rayleigh backscattered optical signal under coherent detection with the local light, and then performing a photoelectric conversion and a demodulation, wherein: the electro-optic modulation is performed by using a single frequency signal; the acousto-optic modulation is performed by using a pulse signal; and the optical pulse is obtained by simultaneously sweeping multiple frequency components of an optical (Continued)

comb signal which is obtained by the electro-optic modulation.

13 Claims, 4 Drawing Sheets

(56) References Cited

U.S. PATENT DOCUMENTS

| | | | | |
|---|---|---|---|---|
| 2014/0176937 | A1* | 6/2014 | Liu | G01D 5/35329 356/73.1 |
| 2016/0191163 | A1* | 6/2016 | Preston | G01B 11/161 398/16 |
| 2016/0231197 | A1* | 8/2016 | Baker | G01M 11/3172 |
| 2016/0245719 | A1* | 8/2016 | Zou | G01M 11/3109 |
| 2016/0254646 | A1* | 9/2016 | Li | H01S 3/0627 372/32 |
| 2017/0108358 | A1* | 4/2017 | Bastianini | G01D 5/35303 |

FOREIGN PATENT DOCUMENTS

| | | |
|---|---|---|
| CN | 105067103 | 11/2015 |
| CN | 105490738 | 4/2016 |
| CN | 205453695 | 8/2016 |
| JP | 64-75932 | 3/1989 |
| JP | 2002-090259 | 3/2002 |
| JP | 2011-158330 | 8/2011 |
| JP | 2011-174760 | 9/2011 |
| JP | 2013-007695 | 1/2013 |

OTHER PUBLICATIONS

Koshikiya et al., "Long Range and cm-Level Spatial Resolution Measurement Using Coherent Optical Frequency Domain Reflectometry With SSB-SC Modulator and Narrow Linewidth Fiber laser", Journal of Lightwave Technology, 26(18):3287-3294 (2008).

International Search Report dated Sep. 28, 2016 in International (PCT) Application No. PCT/CN2016/070108.

Takushi Kazama et al., "Fading noise suppression in OFDR by optical frequency comb and variable delay line", The Institute of Electronics, Information and Communication Engineers, IEICE Technical Report, OFT2010-54 (Jan. 2011) with English Abstract.

Zuyuan He et al., "High-reflectivity-resolution coherent optical frequency domain reflectometry using optical frequency comb source and tunable delay line", Optics Express, Dec. 6, 2011, pp. B764-B769, XP055598952, DOI: https://doi.org/10.1364/0E.19.00B764.

Zhaoyong Wang et al., "Ultra-broadband phase-sensitive optical time-domain reflectometry with a temporally sequenced multi-frequency source", Optics Letters, vol. 40, No. 22, Nov. 4, 2015, p. 5192, XP055462782, US ISSN: 0146-9592, DOI: 10.1364/0L.40.005192.

Dan Xu et al., "10-Times Broadened Fast Optical Frequency Sweeping for High Spatial Resolution OFDR", OFC 2014, OSA, Mar. 9, 2014, pp. 1-3, XP032633249, DOI: 10.1109/OFC.2014.6887118.

Extended European Search Report dated Jul. 16, 2019 in European Patent Application No. 16882854.9.

* cited by examiner

FREQUENCY SYNTHESIS-BASED OPTICAL FREQUENCY DOMAIN REFLECTOMETRY METHOD AND SYSTEM

TECHNICAL FIELD

The present invention relates to a technology in the field of optical sensing, and in particular, to a frequency synthesis-based optical frequency domain reflectometry method and system.

BACKGROUND ART

Since the 1970s, the optical fiber communication technology has developed rapidly for lots of advantages such as its ultra-large transmission bandwidth and ultra-low transmission loss. The optical fiber sensing technology has also developed rapidly as the optical fiber communication technology is developing. The optical fiber sensing technology refers to a technology that uses light waves as carriers and optical fibers as media to measure external physical signals (such as temperature and strain) or various parameters of optical fibers. Compared to the traditional mechanical or electromagnetic sensors, an optical fiber sensor has enormous advantages, such as: it is not affected by the noise caused by electromagnetic interference; it can operate stability under a strong electromagnetic environment; it can be operated in hazardous locations for example, flammable and explosive places, since the optical fiber is an electrical insulator that does not generate electric sparks; it may have an excellent compatibility with an optical fiber communication system to realize ultra-long-range sensing; and the like.

The optical reflectometer technology as an important member in a family of optical fiber sensing technologies refers to a technology for non-destructive detection of an optical fiber network using optical fiber back-scattered light and can be used to measure the distribution conditions of fiber length, loss, connectors, fracture and the like. One of the most important optical reflectometer technologies at present is optical time domain reflectometer (OTDR) technology. The OTDR technology has the advantages like long detection distance up to hundreds of kilometers; simple system structure; low cost; and the commercial products are currently available on the market. The spatial resolution of the OTDR technology (the minimum distance between two adjacent "event points" can be distinguished) depends on the width of the optical pulse, and the narrower the optical pulse is, the higher the spatial resolution is. However, the optical pulse cannot be made to be quite narrow under the limitations of the performances of a laser device and the non-linear effect of the optical fiber. Therefore, the spatial resolution of the OTDR technology is poor, which limits the application of the OTDR technology.

In order to solve the problem of spatial resolution, the researchers proposed an optical frequency domain reflectometer (OFDR) technology. The spatial resolution of the OFDR technology depends on a frequency tuning range of an optical source. As long as the frequency tuning range of the optical source is larger, the theoretical spatial resolution is higher. However, the OFDR technology also faces two major problems. First, the detection distance of the OFDR technology is relatively short, and the maximum detection distance generally does not exceed half of a coherence distance of a laser device. It has been reported in a literature that an auxiliary interferometer is used for phase noise compensation to increase the detection distance [Opt. Lett. 32(22), 3227-3229 (2007)], but this technology has a high hardware complexity and long data processing time due to complex phase noise compensation algorithm, and it cannot compensate phase noise introduced by environmental factors. Secondly, the frequency tuning range of the optical source is limited, and therefore, the spatial resolution is hardly increased. It has been reported in a literature that a narrow-linewidth laser device is modulated using a radio frequency sweep signal source and a single-sideband modulator to obtain a wide-range linear frequency-swept optical source, thereby achieving high spatial resolution [J. Lightwave Technol. 6, 3287-3294 (2008)]. This scheme has now become the mainstream choice for the externally modulated OFDR system. However, the single-sideband modulator has the disadvantages of complicated use, high cost, large insertion loss, etc., and more seriously it cannot completely suppress the other sidebands to realize single-sideband frequency sweeping, which badly affects the frequency sweeping performance. In addition, the sweeping range of this scheme is limited by the performances of a radio frequency sweep signal source. Therefore, it is very necessary to find an optical reflectometer that achieves high spatial resolution and long detection distance.

It was found by searching the prior art that Chinese Patent Document No. CN103763022A (published on Apr. 30, 2014) disclosed a high spatial resolution optical frequency domain reflectometer system based on high-order sideband frequency sweeping modulation, which comprises a frequency-swept optical source part, a test optical path part, a receiver and a signal processing part, wherein: the frequency-swept optical source part uses a narrow-linewidth laser device as an original optical source; and emergent light generates a frequency-swept sideband optical signal by means of external modulation. During the external modulation: the radio frequency sweep signal is amplified by a high-power radio frequency amplifier and then applied to an electro-optic modulator with a relatively low half-wave voltage in a high-voltage mode, so that multi-order sidebands are generated and filtered through a narrow-band optical filter to generate a high-order broadband frequency-swept optical sideband; the high-order optical sideband serves as a frequency-swept carrier wave optical source to be guided into an optical path system; backscattered and reflected optical signals are collected; local coherent detection and signal processing are performed; and thereby an optical frequency domain reflection analysis is implemented. However, the hardware complexity of this technology is high, and the filtering effect is limited by the performances of the filter, such that the other sidebands cannot be completely suppressed, which seriously affects the frequency sweeping performance; after the rest sidebands are filtered out, the optical power loss is extremely high, and a high-magnification optical amplifier is required for amplification to bring extra phase noise.

SUMMARY OF THE INVENTION

With respect to the above-mentioned defects of the prior art, the present invention provides frequency synthesis-based optical frequency domain reflectometry method and system utilizing an electro-optic modulator and an acousto-optic modulator to generate optical pulse signals of which multiple frequencies are swept simultaneously, through which the limitations from performances of a modulator and a radio frequency sweep signal source are broken through, optical signals with good linearity, single frequency and large sweeping range are obtained, and the spatial resolution and the detection distance are improved without increasing the hardware cost and the software complexity of the system.

The present invention is implemented through the following technical solutions.

The present invention relates to a frequency synthesis-based optical frequency domain reflectometry method, which is to implement optical frequency reflectometry and comprises: performing an electro-optic modulation and an acousto-optic modulation on a local light to obtain an optical pulse; inputting the optical pulse as a detection pulse optical signal to a test optical fiber; and detecting an obtained Rayleigh backscattered optical signal under coherent detection with the local light, and then performing a photoelectric conversion and a demodulation, wherein: the electro-optic modulation is performed by using a single frequency signal; the acousto-optic modulation is performed by using a pulse signal; and the optical pulse is obtained by simultaneously sweeping multiple frequency components of an optical comb signal which is obtained by the electro-optic modulation.

The local light is a narrow-linewidth laser.

The pulse signal is a chirped pulse signal.

A frequency interval of the optical comb signal is equal to a sweeping range of the pulse signal.

The electro-optic modulation modulates a high-frequency sinusoidal electrical signal to a single frequency optical signal in an intensity modulation manner or in a phase modulation manner and generates an optical comb signal.

The acousto-optic modulation modulates the optical comb signal by using a pulse signal and obtains a multi-frequency sweep optical pulse signal.

The present invention relates to a frequency synthesis-based optical frequency domain reflectometry system, which comprises: a reference optical branch and a modulation optical branch homologous therewith; a coupling unit; and a demodulation unit, wherein: an output end of the reference optical branch and an output end the modulation optical branch are both connected with the coupling unit; and an output end of the coupling unit is connected with the demodulation unit.

An input end of the reference optical branch and an input end of the modulation optical branch receive a narrow-linewidth laser from a common laser device, preferably, the laser device outputs the narrow-linewidth laser with a splitting ratio of 99:1 to the modulation optical branch and the reference optical branch respectively through an optical fiber coupler.

The reference optical branch is preferably provided with a polarization controller.

The modulation optical branch comprises an electro-optic modulator, an acousto-optic modulator, an erbium-doped optical fiber amplifier, an optical fiber circulator and a test optical fiber which are sequentially connected in series, wherein: the electro-optic modulator performs a modulation by a single frequency signal to generate an optical comb signal; the optical comb signal input into the acousto-optic modulator is modulated by a pulse signal to obtain a multi-frequency sweep optical pulse signal, amplified by the erbium-doped optical fiber amplifier, and then output to the optical fiber circulator and the test optical fiber; a reflecting end of the optical fiber circulator serves as an output of the modulation optical branch and is connected with the coupling unit.

The electro-optic modulator is an electro-optic intensity modulator or in an electro-optic phase modulator.

The coupling unit is a 50:50 optical fiber coupler, but not limited to it, and a local light from the reference optical branch and a Rayleigh backscattered light output from the optical fiber circulator are coherent-detected in the 50:50 optical fiber coupler.

The demodulation unit comprises a photoelectric conversion module, a data acquisition card and a demodulation module, wherein: the data acquisition card collects electrical signals converted by the photoelectric conversion module; and the demodulation module demodulates the electrical signals.

Technical Effects

Compared with the prior art, the present invention has the following technical effects:

1) the acousto-optic modulator is adopted to perform frequency sweeping on the narrow-linewidth laser to obtain a better single-sideband sweeping effect free from the interference of the other sidebands and lower insertion loss, which is simple to use and has more stable performance;

2) the acousto-optic modulator performs pulse cutting on detection light to effectively suppress the influences on an optical phase from the phase noise of laser and environments, such that the maximum detection distance of the system breaks through the coherence distance limitation without increasing the hardware cost and the software complexity of the system; and 3) a method for performing frequency sweeping on a plurality of frequencies simultaneously and performing frequency synthesis in a digital domain is adopted to break through the limitations of the maximum sweeping range of the acousto-optic modulator and the radio frequency sweep signal source, thereby multiplied increasing the spatial resolution of the system.

Figure 1:
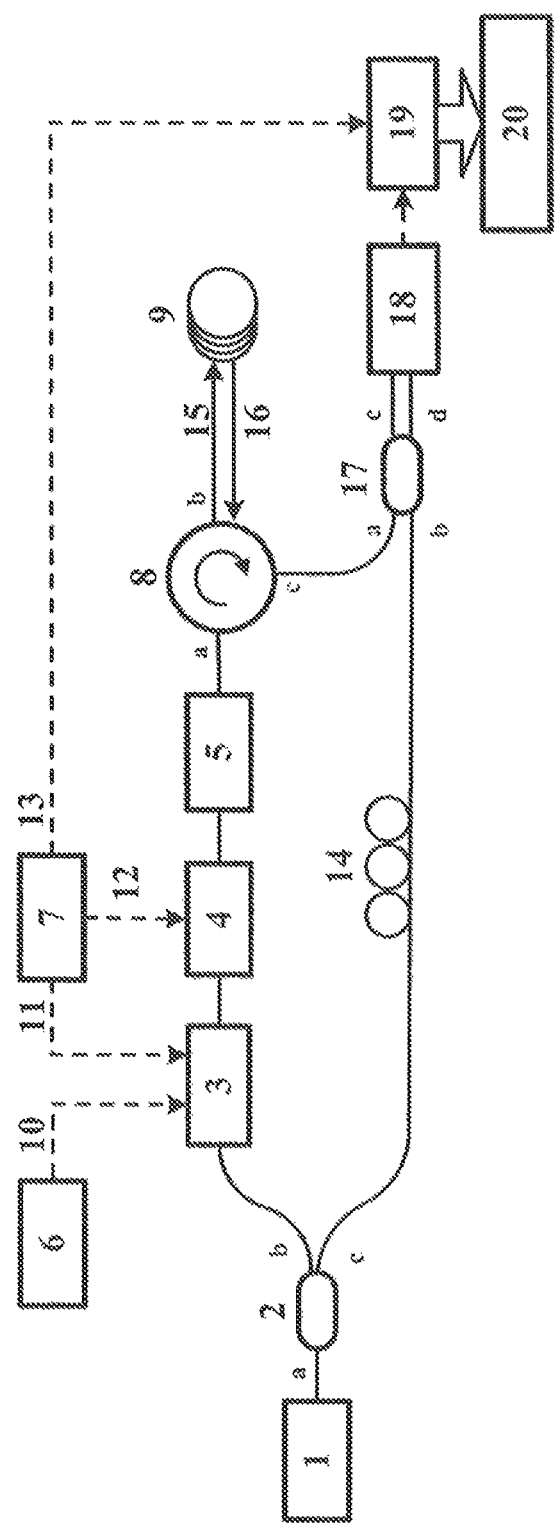
FIG. 1 is a schematic diagram of the present invention.

In the figures, reference numeral 1 represents a narrow-linewidth optical fiber laser device; reference numeral 2 represents an optical fiber coupler; reference numeral 3 represents an electro-optic modulator; reference numeral 4 represents an acousto-optic modulator; reference numeral 5 represents an erbium-doped optical fiber amplifier; reference numeral 6 represents a DC voltage source; reference numeral 7 represents a dual-channel arbitrary waveform generator; reference numeral 8 represents an optical fiber circulator; reference numeral 9 represents a test optical fiber; reference numeral 10 represents a DC bias voltage; reference numeral 11 represents a single frequency sinusoidal signal; reference numeral 12 represents a radio frequency sweep pulse signal; reference numeral 13 represents a trigger and reference clock signal; reference numeral 14 represents a polarization controller; reference numeral 15 represents a detection pulse optical signal; reference numeral 16 represents a Rayleigh backscattered optical signal; reference numeral 17 represents a 50:50 optical fiber coupler; reference numeral 18 represents a balance detector; reference numeral 19 represents a data acquisition card; and reference numeral 20 represents a computer.

DESCRIPTION OF EMBODIMENTS

The embodiment of the present invention will be described in detail. The embodiment is implemented on the basis of the technical solution of the present invention, and provides a detailed implementation method and a specific operation process, but the protection scope of the present invention is not limited to the embodiment described below.

Embodiment 1

As shown in FIG. 1, the present embodiment includes: a test optical fiber 9; a signal generation module; and a narrow-linewidth laser optical source module, an optical comb generation module, a frequency sweeping and pulse cutting module, a coherent receiving module, a photoelectric conversion module and a digital signal processing module which are connected in sequence, wherein the coherent receiving module is connected with the test optical fiber 9.

The signal generation module is a dual-channel arbitrary waveform generator 7. The dual-channel arbitrary waveform generator 7 outputs an amplified single frequency sinusoidal signal 11 to the optical comb generation module and outputs a radio frequency sweep pulse signal 12 to the frequency sweeping and pulse cutting module respectively, and sends a trigger and reference clock signal to the digital signal processing module.

The single frequency sinusoidal signal 11 has a frequency of 40 MHz and an initial phase of 0°.

The radio frequency sweep pulse signal 12 has an initial frequency of 180 MHz, a termination frequency of 220 MHz, a sweeping duration of 8 μs, and a sweeping range of 40 MHz.

The test optical fiber 9 is an ordinary single-mode optical fiber with a length of 75 km and is completely exposed in a laboratory environment without any isolation treatment.

The test optical fiber 9 is provided with FC/APC connectors at 25 km, 35 km, 45 km, and 70 km, respectively.

The radio frequency sweep pulse signal 12 is a frequency chirped pulse signal.

The narrow-linewidth laser optical source module includes a narrow-linewidth optical fiber laser device 1 and a 99:1 optical fiber coupler 2 which are connected in sequence, wherein an ultra-narrow linewidth laser generated by the narrow-linewidth optical fiber laser device 1 is split into detection light having a power of 99% and local light having a power of 1% through the 99:1 optical fiber coupler 2.

The optical comb generation module includes a DC voltage source 6 and an electro-optic modulator 3, wherein the DC voltage source 6 adjusts a DC bias voltage 10 input to the electro-optic modulator 3, such that the detection light input to the electro-optic modulator 3 and the single frequency sinusoidal signal 11 generate an optical comb signal.

The electro-optic modulator 3 is an electro-optic intensity modulator or an electro-optic phase modulator. The detection light passes through the electro-optic modulator 3 to output an optical comb signal with multiple frequency components.

The number of the frequency components depends on the settings of a modulation voltage and the DC bias voltage 10, and is therefore variable. In addition, the increase in the number is equivalent to increasing the spatial resolution. In the present embodiment, there are five frequency components, and the frequency interval of the optical comb signal is 40 MHz. In addition, the intensity of each frequency component is basically the same, and the frequency interval is strictly equal to the sweeping range of the swept radio frequency pulse signal 12.

The frequency sweeping and pulse cutting module includes an acousto-optic modulator 4 and an erbium-doped optical fiber amplifier 5 which are connected in sequence, wherein the optical comb signal input to the acousto-optic modulator 4 and the radio frequency sweep pulse signal 12 are subject to frequency sweeping and pulse cutting simultaneously to obtain a multi-frequency sweep optical pulse signal, which is then amplified by the erbium-doped optical fiber amplifier 5 and output.

The coherent receiving module includes an optical fiber circulator 8, a test optical fiber 9 and a 50:50 optical fiber coupler 17 which are connected in sequence, wherein: the multi-frequency sweep optical pulse signal enters from a port a of the optical fiber circulator 8 and enters the test optical fiber 9 from a port b for measure; a returned Rayleigh backscattered optical signal 16 enters from the port b of the optical fiber circulator 8 and emerges from a port c; and the local light output from the optical fiber coupler 2 and the Rayleigh backscattered light 16 output from the optical fiber circulator 8 are coherent-detected in the 50:50 optical fiber coupler 17.

An ultra-narrow linewidth laser generated by the narrow-linewidth optical fiber laser device 1 enters from the port a of the 99:1 optical fiber coupler 2 and is split into detection light from the port b and local light from the port c.

The output end of the optical fiber coupler 2 is preferably provided with a polarization controller 14.

The photoelectric conversion module is implemented by a balance detector 18 in the present embodiment.

The digital signal processing module includes a data acquisition card 19 and a calculation unit 20 which are connected in sequence, wherein the data collected by the data acquisition card 19 is synthesized and processed in the calculation unit 20, that is:

1) the calculation unit 20 generates a digital frequency-swept signal (a complex signal) having segments as many as the frequency components thereof based on the original data obtained by the data acquisition card 19.

When the optical comb signal output from the electro-optic modulator 3 has N frequency components, the frequency interval is Ω. To simplify the analysis, set N=2; the optical comb signal passes through the frequency sweeping and pulse cutting module and then obtains frequency-swept optical pulse signals of two frequencies, each having a sweep frequency of γ, a sweeping duration of $\tau_p$, and a sweeping range of $2\pi\gamma\tau_p$. A Rayleigh scattered light at a point on the test optical fiber is received by the coherent receiving module. The obtained original data can be expressed as:

$$S_{beat1}(t) = rect\left(\frac{t-\tau_0}{\tau_p}\right)A(\tau_0)\exp\{j[\pi\gamma(t-\tau_0)^2 - \omega_L\tau_0 + C]\}$$

$$S_{beat2}(t) = rect\left(\frac{t-\tau_0}{\tau_p}\right)A(\tau_0)\exp\{j[\pi\gamma(t-\tau_0)^2 + \Omega(t-\tau_0) - \omega_L\tau_0 + C]\}$$

in which, $A(\tau_0)$ is reflection coefficient of the reflection point; $\tau_0$ is round trip time of the reflection point; $\omega_L$ is center frequency of the laser device; C is phase noise of the laser device and phase noise introduced by environment; and recto is a rectangular window function. Although the beat signals of the two frequencies enter the data acquisition card at the same time, they can be accurately separated by a filter during the data processing because of their different frequency ranges.

The expressions of the corresponding digital frequency-swept signals are:

$$h_1(t) = rect\left(\frac{t}{\tau_p}\right)\exp\{j[\pi\gamma t^2]\}$$

$$h_2(t) = rect\left(\frac{t}{\tau_p}\right)\exp\{j[\pi\gamma t^2 + \Omega t]\}.$$

In the present embodiment, five segments of digital frequency-swept signals (complex signals) are generated, whose sweeping ranges are 100-140 MHz, 140-180 MHz, 180-220 MHz, 220-260 MHz, and 260-300 MHz, respectively, and duration are all 8 μs.

2) In order to eliminate the influence of side lobes of the reflection point in the demodulation result, the generated complex signals are respectively multiplied by the window function, and subject to cross-correlation operations with the original data collected by the data acquisition card 19 to obtain a corresponding correlation function (a complex function).

In the present embodiment, a Hanning window function is used as the window function. In other cases, other types of window functions may also be used.

The expressions of the correlation functions are:

$$R_1(t) = \frac{A\sin[\pi\gamma(t-\tau_0)(\tau_p - |t-\tau_0|)]}{\pi\gamma(t-\tau_0)} e^{j\pi\gamma\tau_p t + jC}$$

$$R_2(t) = \frac{A\sin[\pi\gamma(t-\tau_0)(\tau_p - |t-\tau_0|)]}{\pi\gamma(t-\tau_0)} e^{j\pi\gamma\tau_p t + \Omega + jC}.$$

3) The obtained complex functions are directly added and subject to modulo operation to obtain a synthesis demodulation result of a digital frequency-swept signal.

If and only if $\Omega = 2\pi\gamma\tau_p$, i.e., the frequency interval of the optical comb signal is strictly equal to the sweeping range of the radio frequency sweep pulse signal, the two complex functions obtained are directly added to realize synthesis of a multi-segment digital frequency-swept signal. The demodulation result is as shown in the following formula:

$$|R(t)| = |R_1(t) + R_2(t)| = \left|\frac{2A\sin[\pi\gamma(t-\tau_0)(\tau_p - |t-\tau_0|)]}{\pi\gamma(t-\tau_0)} \cdot \cos(\pi\gamma\tau_p t)\right|.$$

Compared with the demodulation result before synthesis, the peak of the demodulation result after the synthesis is narrower and higher, thereby achieving the technical effect of improving the spatial resolution.

Figure 2:
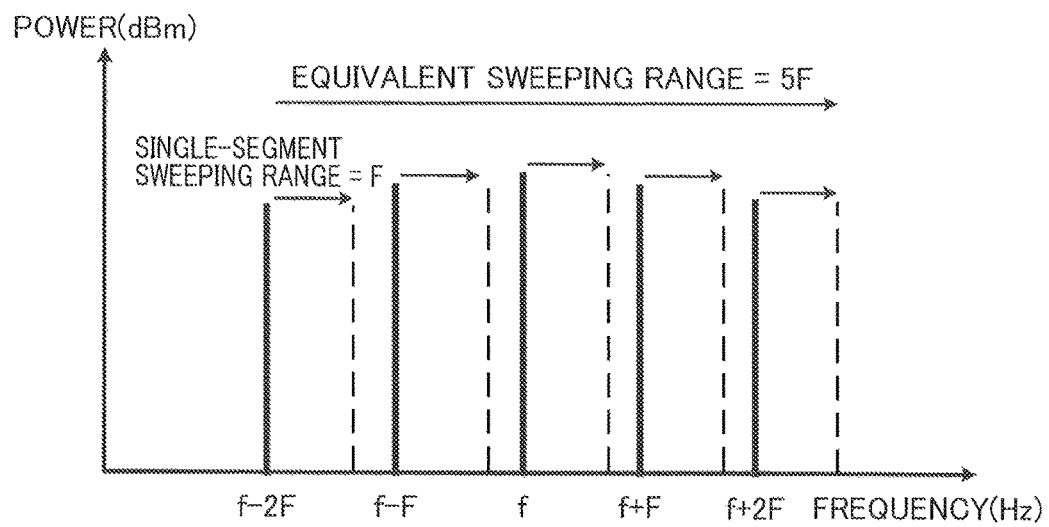
FIG. 2 is a schematic diagram of an optical spectrum of an optical pulse signal.

As shown in FIG. 2, a single-segment sweeping range is 40 MHz, and the five-segment sweeping synthesis can be equivalent to a 200 MHz sweeping range.

Figure 3:
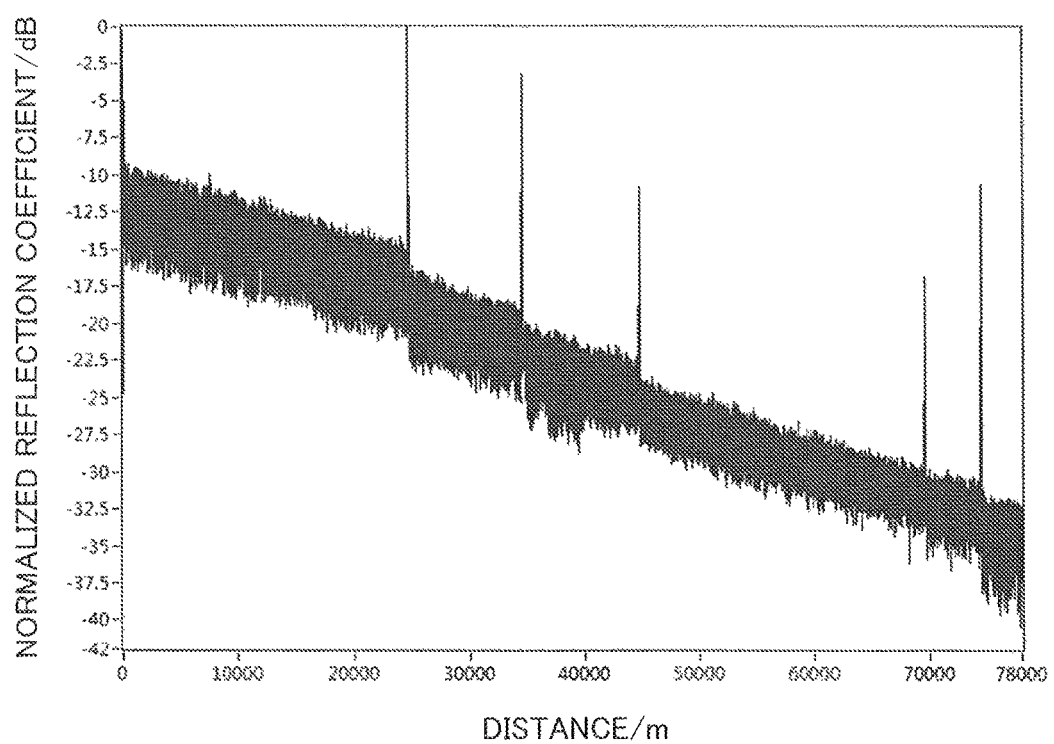
FIG. 3 is a curve diagram of output signals according to an embodiment of the invention.

As shown in FIG. 3, it can be clearly seen that there are 6 reflection points. The first reflection point is a connector of the port b of the optical fiber circulator 8 and the test optical fiber 9. According to theoretical analysis, the single-segment sweeping range is 40 MHz, and the corresponding spatial resolution is 2.5 m. After the window function is added for demodulation, the theoretical spatial resolution should be 5 m. After the five-segment sweeping synthesis, the equivalent sweeping range is 200 MHz, and the corresponding spatial resolution is 0.5 m. After the window function is added for demodulation, the theoretical spatial resolution should be 1 m.

Figure 4:
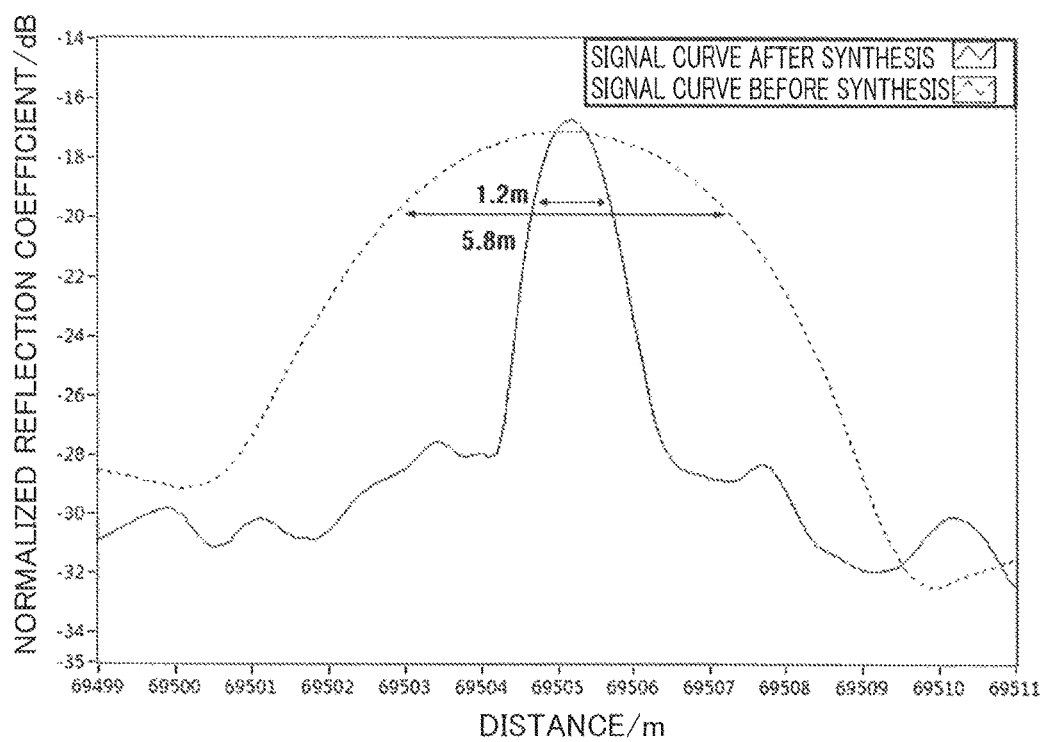
FIG. 4 is a comparison diagram showing before and after frequency synthesis of a reflection point of a FC/APC connector at 70 km of a test optical fiber according to an embodiment of the invention.

As shown in FIG. 4, the spatial resolution after synthesis can be measured as 1.2 m by the reflection point at 70 km of the test optical fiber 9, which is about 5 times higher than the spatial resolution of 5.8 m before synthesis and is highly consistent with theoretical analysis.

A local optical signal received by the 50:50 fiber coupler 17 is a non-swept optical signal with a constant frequency, which is different from the frequency chirped local light of the conventional OFDR system.

The dual-channel arbitrary waveform generator 7 outputs the trigger and reference clock signal to the data acquisition card 19 so that two clocks thereof are completely synchronized.

The balance detector 18 performs photoelectric conversion.

The digital signal is synthesized into an equivalent large sweeping range signal in the calculation unit 20 to realize optical frequency domain reflection analysis with high spatial resolution.

The detection light sequentially passes through the electro-optic modulator 3 and the acousto-optic modulator 4 to form pulse light of which multiple frequencies are swept simultaneously, which is different from single frequency sweep detection light with a constant optical power of the conventional OFDR system.

The acousto-optic modulator 4 substitutes for a conventional single-sideband modulator to perform frequency sweeping on a narrow-linewidth laser to obtain a better single-sideband sweeping effect free from interference of the other sidebands, such that it is simple to use, and has lower insertion loss and more stable performance.

The acousto-optic modulator can perform pulse cutting on a detection light signal to effectively suppress the influences on an optical phase from the phase noise of laser and environment, such that the maximum detection distance in the present embodiment breaks through the coherence distance limitation without increasing the hardware cost and the software complexity of the system.

A method for performing frequency sweeping on multiple frequencies simultaneously and performing frequency synthesis in a digital domain is adopted in the present embodiment to break through the limitations of the maximum sweeping range of the acousto-optic modulator 4 and the radio frequency sweep signal source, thereby multiplied increasing the spatial resolution of the system.

The results of the present embodiment shows that, on one hand, a digital synthesis OFDR of which a plurality of frequencies are swept simultaneously can multiplied increase the spatial resolution wherein the increasing times is equal to the number of the frequencies, and break through the limitation of the sweeping range of the acousto-optic modulator; on the other hand, the distance 70 km on the test optical fiber 9 has exceeded the coherence length of the optical source, but the spatial resolution is still consistent with the theoretical resolution, which indicates that the phase noise has little effect on the system and the phase noise influence is effectively suppressed in the present embodiment. In case that the power of the detection light is increased, an optical fiber with longer distance can be detected; similarly, the spatial resolution may be increased by increasing the number of frequency components of the optical comb signal.

The invention claimed is:

1. A frequency synthesis-based optical frequency domain reflectometry method to implement optical frequency reflectometry, comprising:
performing an electro-optic modulation and an acousto-optic modulation on a local light to obtain an optical pulse;
inputting the optical pulse as a detection pulse optical signal to a test optical fiber; and
detecting an obtained Rayleigh backscattered optical signal under coherent detection with the local light, and then performing a photoelectric conversion and a demodulation, wherein:
the electro-optic modulation is performed by using a single frequency signal;
the acousto-optic modulation is performed by using a pulse signal; and
the optical pulse is obtained by simultaneously sweeping multiple frequency components of an optical comb signal which is obtained by the electro-optic modulation.

2. The frequency synthesis-based optical frequency domain reflectometry method according to claim 1, wherein:
the local light is a narrow-linewidth laser; and
the pulse signal is a chirped pulse signal.

3. The frequency synthesis-based optical frequency domain reflectometry method according to claim 1, wherein a frequency interval of the optical comb signal is equal to a sweeping range of the pulse signal.

4. The frequency synthesis-based optical frequency domain reflectometry method according to claim 1, wherein the electro-optic modulation modulates a high-frequency sinusoidal electrical signal to a single frequency optical signal in an intensity modulation manner or in a phase modulation manner and generates an optical frequency comb signal.

5. The frequency synthesis-based optical frequency domain reflectometry method according to claim 1, wherein the acousto-optic modulation modulates the optical comb signal by using a pulse signal and obtains a multi-frequency sweep optical pulse signal.

6. A frequency synthesis-based optical frequency domain reflectometry method to implement optical frequency reflectometry, comprising:
performing an electro-optic modulation and an acousto-optic modulation on a local light to obtain an optical pulse;
inputting the optical pulse as a detection pulse optical signal to a test optical fiber; and
detecting an obtained Rayleigh backscattered optical signal under coherent detection with the local light, and then performing a photoelectric conversion and a demodulation, wherein:
the electro-optic modulation is performed by using a single frequency signal;
the acousto-optic modulation is performed by using a pulse signal; and
the optical pulse is obtained by simultaneously sweeping multiple frequency components of an optical comb signal which is obtained by the electro-optic modulation, wherein the demodulation includes:
generating a digital frequency-sweep signal having segments as many as frequency components thereof according to an electrical signal obtained by the photoelectric conversion;
multiplying the generated multiple segments of complex signals by a window function respectively and performing cross-correlation operations with the original data respectively to obtain a corresponding correlation function;
adding the obtained multiple complex functions directly and performing modulo operations to obtain a synthesis demodulation result of the multiple segments of digital frequency-sweep signals.

7. The frequency synthesis-based optical frequency domain reflectometry method according to claim 6, wherein the window function is a Hanning window function.

8. A frequency synthesis-based optical frequency domain reflectometry system comprising:
a reference optical branch and a modulation optical branch homogenous therewith;
a coupling unit; and
a demodulation unit, wherein:
an output end of the reference optical branch and an output end of the modulation optical branch are both connected with the coupling unit, and an output end of the coupling unit is connected with the demodulation unit;
the modulation optical branch comprises an electro-optic modulator, an acousto-optic modulator, an erbium-doped optical fiber amplifier, an optical fiber circulator and a test optical fiber which are sequentially connected in series;
the electro-optic modulator performs a modulation by a single frequency signal to generate an optical comb signal;
the optical comb signal input into the acousto-optic modulator is modulated by a pulse signal to obtain a multi-frequency sweep optical pulse signal, amplified by the erbium-doped optical fiber amplifier, and then output to the optical fiber circulator and the test optical fiber in turn;
a reflecting end of the optical fiber circulator serves as an output of the modulation optical branch and is connected with the coupling unit.

9. The frequency synthesis-based optical frequency domain reflectometry system according to claim 8, wherein:
an input end of the reference optical branch and an input end of the modulation optical branch receive a narrow-linewidth laser from a common laser device;
the laser device outputs the narrow-linewidth laser with a splitting ratio of 99:1 to the modulation optical branch and the reference optical branch respectively through an optical fiber coupler.

10. The frequency synthesis-based optical frequency domain reflectometry system according to claim 8, wherein the reference optical branch is provided with a polarization controller.

11. The frequency synthesis-based optical frequency domain reflectometry system according to claim 8, wherein the electro-optic modulator is an electro-optic intensity modulator or an electro-optic phase modulator.

12. The frequency synthesis-based optical frequency domain reflectometry system according to claim 8, wherein:
the coupling unit is a 50:50 optical fiber coupler;
a local light from the reference optical branch and a Rayleigh backscattered light output from the optical fiber circulator are coherent-detected in the 50:50 optical fiber coupler.

13. A frequency synthesis-based optical frequency domain reflectometry system comprising:
a reference optical branch and a modulation optical branch homogenous therewith;
a coupling unit; and a demodulation unit, wherein:

an output end of the reference optical branch and an output end of the modulation optical branch are both connected with the coupling unit, and an output end of the coupling unit is connected with the demodulation unit;

the modulation optical branch comprises an electro-optic modulator, an acousto-optic modulator, an erbium-doped optical fiber amplifier, an optical fiber circulator and a test optical fiber which are sequentially connected in series;

the electro-optic modulator performs a modulation by a single frequency signal to generate an optical comb signal;

the optical comb signal input into the acousto-optic modulator is modulated by a pulse signal to obtain a multi-frequency sweep optical pulse signal, amplified by the erbium-doped optical fiber amplifier, and then output to the optical fiber circulator and the test optical fiber in turn;

a reflecting end of the optical fiber circulator serves as an output of the modulation optical branch and is connected with the coupling unit, the demodulation unit comprises a photoelectric conversion module, a data acquisition card and a demodulation module; and the data acquisition card collects electrical signals converted by the photoelectric conversion module, and the demodulation module demodulates the electrical signals.

* * * * *